United States Patent
Wang et al.

(10) Patent No.: US 11,270,454 B2
(45) Date of Patent: Mar. 8, 2022

(54) VOLUME MEASURING APPARATUS AND VOLUME MEASURING METHOD FOR BOX

(71) Applicant: CHAMPTEK INCORPORATED, New Taipei (TW)

(72) Inventors: Kuo-Chun Wang, New Taipei (TW); Shu-Ying Huang, New Taipei (TW)

(73) Assignee: CHAMPTEK INCORPORATED, New Taipei (TW)

( * ) Notice: Subject to any disclaimer, the term of this patent is extended or adjusted under 35 U.S.C. 154(b) by 0 days.

(21) Appl. No.: 17/096,510

(22) Filed: Nov. 12, 2020

(65) Prior Publication Data

US 2021/0166413 A1    Jun. 3, 2021

(30) Foreign Application Priority Data

Dec. 3, 2019 (TW) ................................ 108144168

(51) Int. Cl.
| | |
|---|---|
| *G06T 7/62* | (2017.01) |
| *G06T 7/55* | (2017.01) |
| *H04N 5/225* | (2006.01) |
| *H04N 5/247* | (2006.01) |

(52) U.S. Cl.
CPC ................. *G06T 7/62* (2017.01); *G06T 7/55* (2017.01); *H04N 5/2256* (2013.01); *H04N 5/247* (2013.01)

(58) Field of Classification Search
None
See application file for complete search history.

(56) References Cited

U.S. PATENT DOCUMENTS

| 7,463,783 | B1* | 12/2008 | Dugan | G06K 9/38 |
| | | | | 382/251 |
| 2005/0211108 | A1 | 9/2005 | Carabin | |
| 2017/0091957 | A1 | 3/2017 | Driegen et al. | |
| 2018/0321383 | A1 | 11/2018 | Heidemann et al. | |
| 2019/0213389 | A1* | 7/2019 | Peruch | G06K 9/6202 |

OTHER PUBLICATIONS

Search Report dated Apr. 26, 2021 of the corresponding European patent application No. 20207455.5.

* cited by examiner

*Primary Examiner* — Edemio Navas, Jr.
(74) *Attorney, Agent, or Firm* — Chun-Ming Shih; HDLS IPR Services

(57) ABSTRACT

A volume measuring apparatus having a first camera, a second camera, an emitting unit and a processing unit is disclosed. The processing unit controls the emitting unit to emit invisible structure light, and controls the first and second camera to capture a left and a right image both containing a target-box. The processing unit generates a depth graph according to the left and right image, and scans the depth graph through multiple scanning lines for determining a middle line, a bottom line, a left-sideline, and a right-sideline of the target-box in the depth graph. The processing unit performs scanning, within a range of the middle line, the bottom line, the left-sideline, and the right-sideline, for obtaining a plurality of width information, height information, and length information. The processing unit computes the volume related data of the target-box according to the plurality of width information, height information, and length information.

15 Claims, 13 Drawing Sheets

VOLUME MEASURING APPARATUS AND VOLUME MEASURING METHOD FOR BOX

BACKGROUND OF THE INVENTION

1. Technical Field

The technical field relates to a measuring apparatus and a measuring method, and specifically relates to a measuring apparatus and a measuring method for measuring a volume of boxes.

2. Description of Related Art

General speaking, shipping companies calculated their transportation fees based on the volume and the weight of the transported items, and warehousing companies calculated their storage fees based on the volume and the weight of the stored items. For the sake of calculation, it is critical for these companies to effectively measure the volume and/or the weight of the processed items.

Part of the shipping companies has built a measuring system inside their factories. The measuring system at least includes a conveyor for conveying the items, and also includes a measure apparatus and a weight scale arranged in a measuring region. While the items is conveyed to the measuring region, the measuring system measures the size, such as length, width, height of the items through the measuring apparatus, and also measures the weight of the items through the weight scale.

However, this kind of measuring system usually has a huge volume and is hardly to be re-located, which is inconvenient to the staffs of the companies.

Moreover, part of the logistics companies prefers not to consider the weight of the items in order to speed up their processing efficiency. In doing so, they directly produce and sell multiple types of box each has a pre-determined size (such as a big size, a middle size, a small size, etc.). When processing the items, the logistics companies directly charge the transportation fee and the process fee according to the size of the boxes carrying the items. As a result, the measuring procedure can be omitted. However, the size of such boxes is limiting, it is hard to satisfy all the user's demand.

Accordingly, a novel volume measuring approach is needed to the market for assisting the companies in measuring the items' volume quickly and conveniently.

SUMMARY OF THE INVENTION

The disclosure is directed to a volume measuring apparatus and a volume measuring method for a box, which generates a depth graph containing a target box based on the images respectively obtained by two cameras, and then computes a volume related data of the target box directly according to the depth graph.

In one of the exemplary embodiments, the volume measuring apparatus of the present invention includes a first camera, a second camera, a structure light emitting unit, and a processing unit. When the processing unit is triggered, it controls the structure light emitting unit to emit invisible structure light onto a target box, and controls the first camera and the second camera to respectively capture a left image and right image both containing an image of the target box, and then generates a depth graph based on the left image and the right image. The processing unit scans the depth graph according to multiple scanning lines for retrieving a middle line, a bottom line, a left-side line, and a right-side line of the target box in the depth graph, and scans within a range of the middle line, the bottom line, the left-side line, and the right-side line through the multiple scanning lines for obtaining multiple widths, heights, and lengths of the target box. Therefore, the processing unit may compute a volume related data of the target box based on the multiple widths, heights, and lengths.

The present invention captures the images of a target box through two separated cameras arranged on a portable volume measuring apparatus, and directly computes the volume related data of the target box based on the images. In comparison with related arts, the volume measuring apparatus of the present invention may assist the staffs in the warehousing companies and shipping companies in measuring the volume of different kinds of boxes quickly and conveniently.

DETAILED DESCRIPTION OF THE INVENTION

In cooperation with the attached drawings, the technical contents and detailed description of the present invention are described hereinafter according to multiple embodiments, being not used to limit its executing scope. Any equivalent variation and modification made according to appended claims is all covered by the claims claimed by the present invention.

The present invention discloses a volume measuring apparatus for measuring the volume of a box, which may be used to precisely measure a volume related data, such as width information, height information, length information, etc., of a rectangular box. By using the volume measuring apparatus of the present invention, it is convenient for the users to record and to calculate (or compute) the volume of the box, as well as to calculate the processing cost such as packaging fee, transportation fee, etc. of the box.

Figure 1:
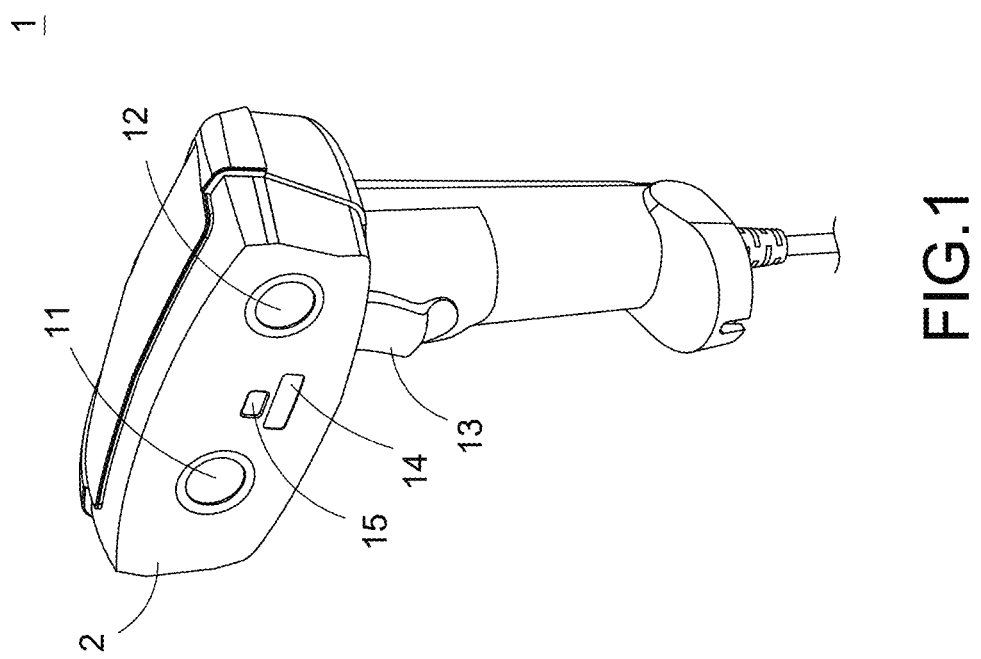
FIG. 1 is a schematic diagram of a volume measuring apparatus of a first embodiment according to the present invention.
Figure 2:
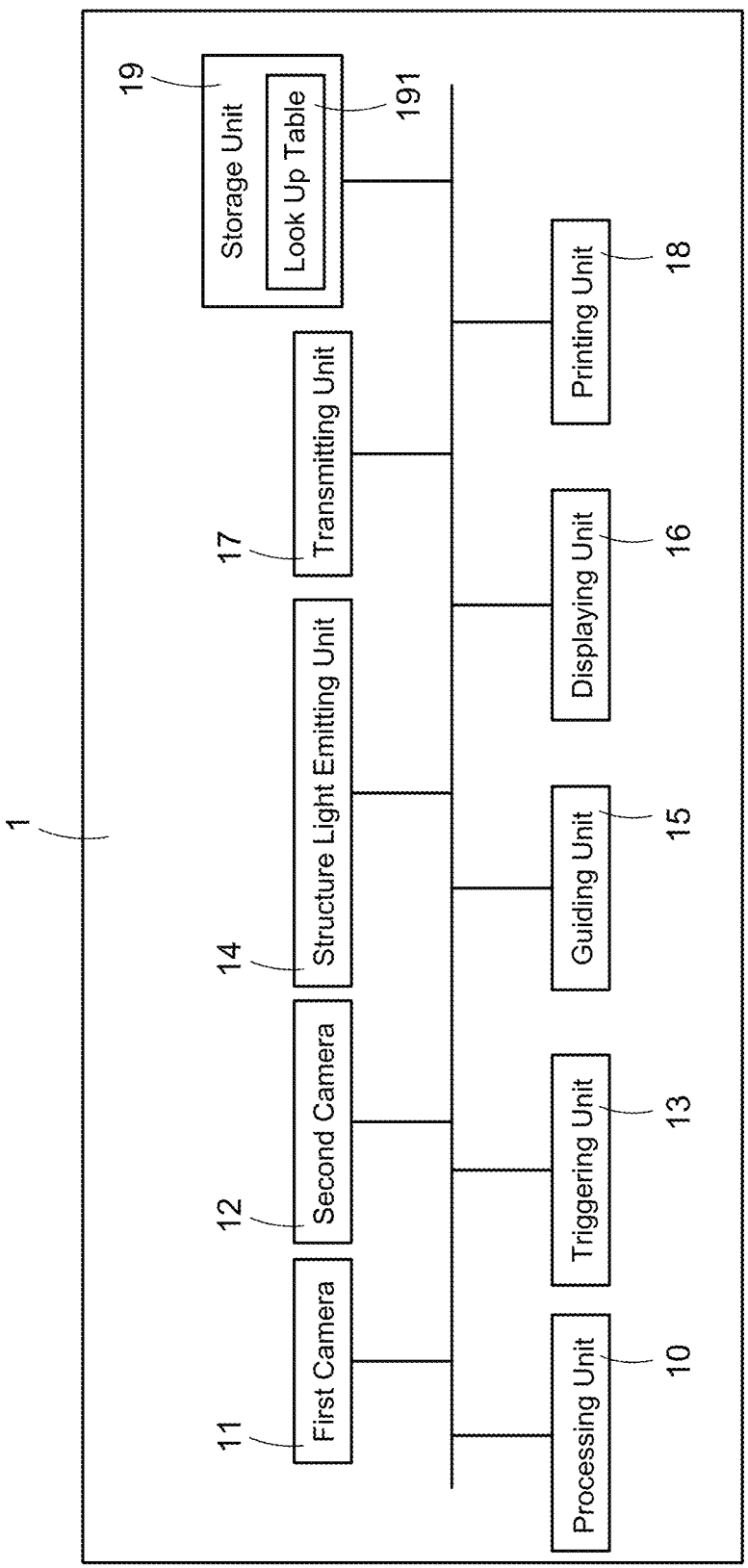
FIG. 2 is a block diagram of a volume measuring apparatus of a first embodiment according to the present invention.

Please refer to FIG. 1 and FIG. 2, FIG. 1 is a schematic diagram of a volume measuring apparatus of a first embodiment according to the present invention, FIG. 2 is a block diagram of a volume measuring apparatus of a first embodiment according to the present invention.

FIG. 1 in company with FIG. 2 discloses a volume measuring apparatus for the box of the present invention (referred to as the measuring apparatus 1 hereinafter in the specification), the measuring apparatus 1 is a portable apparatus having a small volume and easily to be carried by a user. The user may carry the measuring apparatus 1 and move freely. The user may hold the measuring apparatus 1 by hands and measure any boxes to directly obtain a volume related data such as width, height, length, etc. of the boxes, which is convenient for the user.

As disclosed in FIG. 1, the measuring apparatus 1, in one of the exemplary embodiments, has a shell 2 with a specific shape. The measuring apparatus 1 at least includes a first camera 11 and a second camera 12, and the first camera 11 and the second camera 12 are arranged on same side of the shell 2 (such as a first surface of the shell 2). In the present invention, the measuring apparatus 1 captures two images of single box from different field of views (FoVs) respectively by the first camera 11 and the second camera 12, and the measuring apparatus 1 calculates (or computes) the volume related data of this box with the processing to the two images.

As shown in FIG. 2, the measuring apparatus 1, in one of the exemplary embodiments, further includes a processing unit (such as a processor) 10 which is electrically connected with the first camera 11 and the second camera 12. When the measuring apparatus 1 is aimed at a target box and triggered, the processing unit 10 controls the first camera 11 to capture a left image with respect to a first FoV, and the processing unit 10 controls the second camera 12 to capture a right image with respect to a second FoV. In this embodiment, both of the left image and the right image contain an image of the entire target box, and the left image and the right image also contain reference information other than the target box (detailed described in the following).

Figure 4:
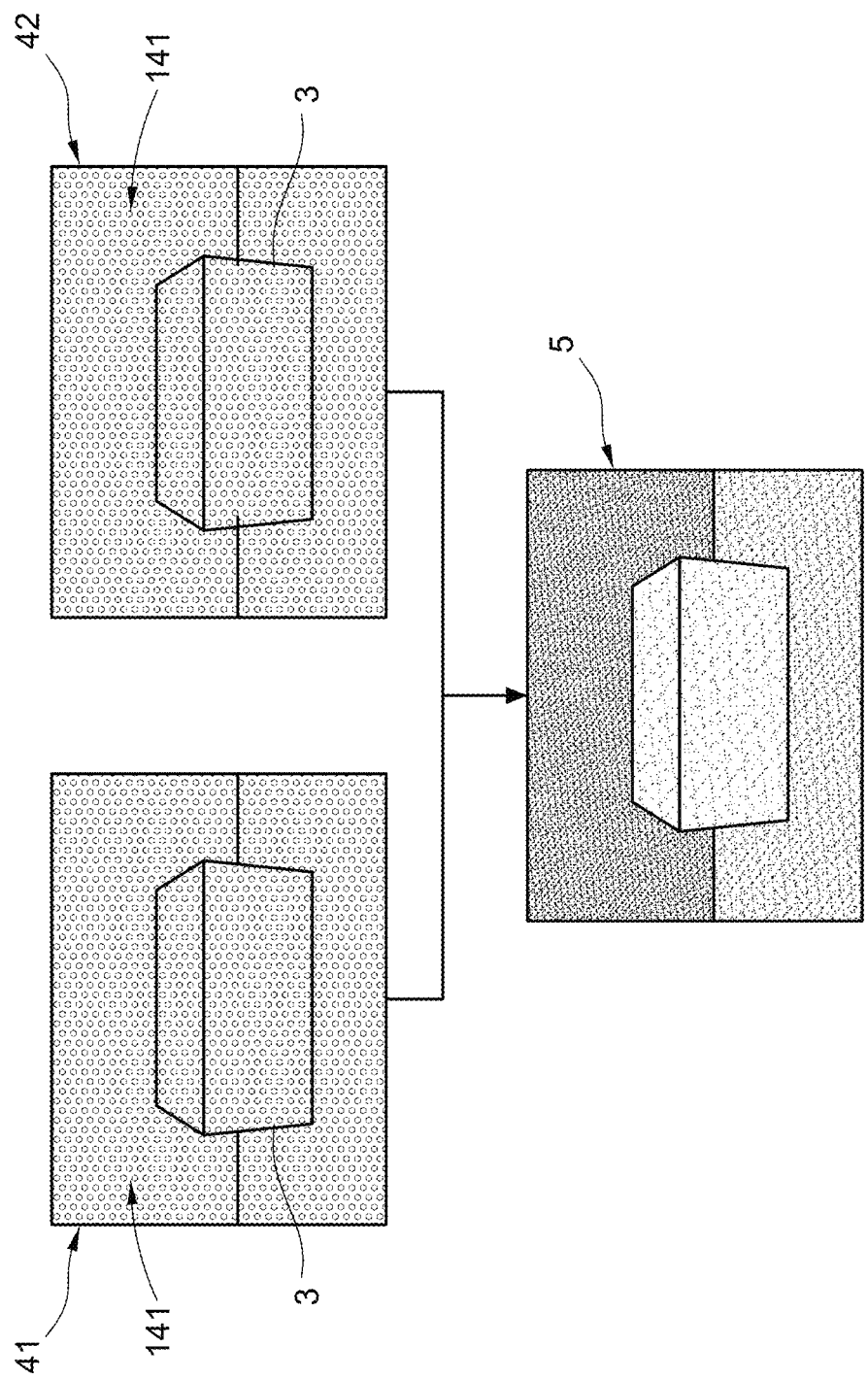
FIG. 4 is a schematic diagram showing a production of a depth graph of a first embodiment according to the present invention.
Figure 9A:
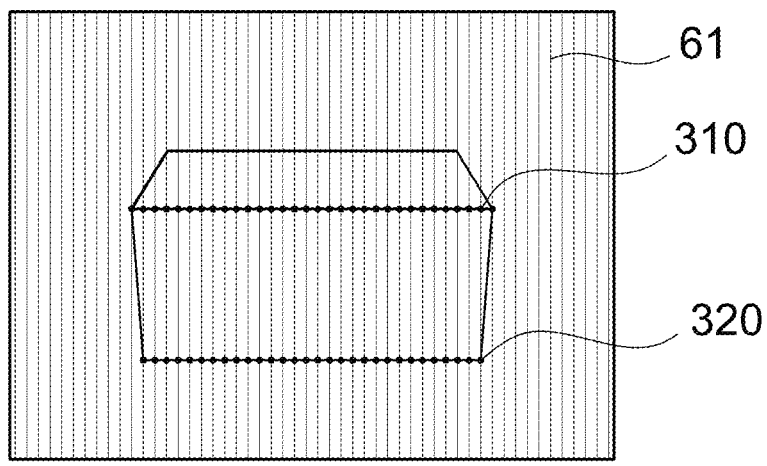
FIG. 9A is a first acting diagram showing a box boundary determination according to the present invention.
Figure 9B:
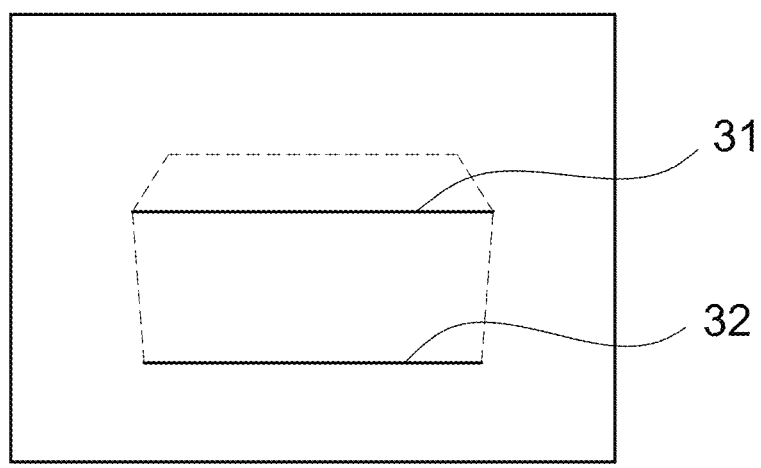
FIG. 9B is a second acting diagram showing the box boundary determination according to the present invention.
Figure 9C:
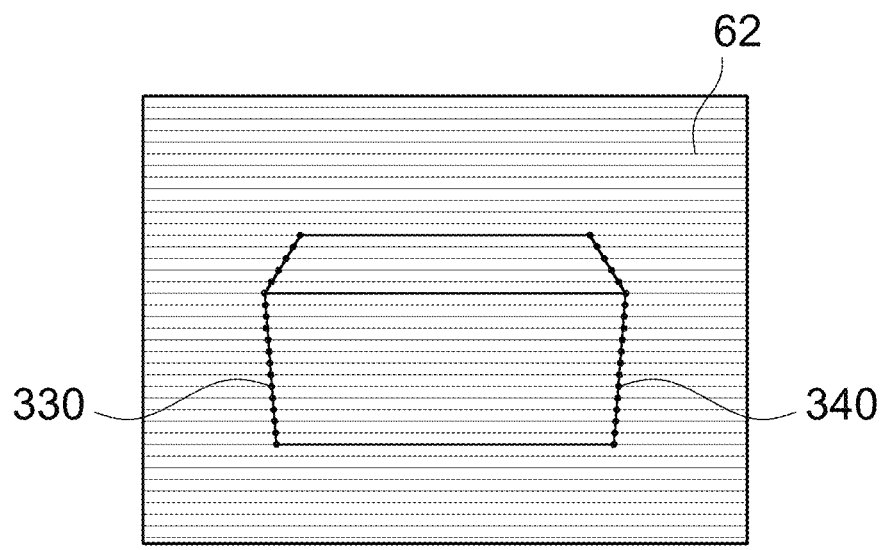
FIG. 9C is a third acting diagram showing the box boundary determination according to the present invention.
Figure 9D:
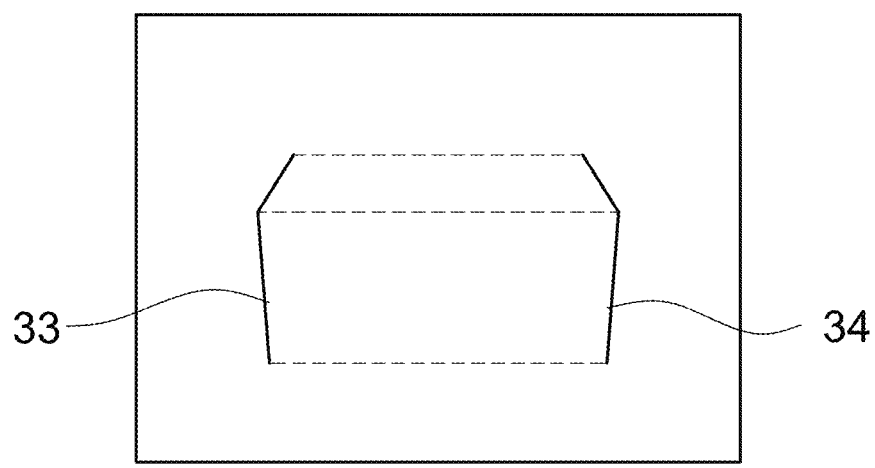
FIG. 9D is a fourth acting diagram showing the box boundary determination according to the present invention.

One of the technical features of the present invention is that, when the left image and the right image are obtained, the processing unit 10 performs a calculation (or computation) based on the left image and the right image (and the reference information) through a depth transforming algorithm for generating a corresponding depth graph. The depth graph at least contains depth information of the target box and depth information of the background around the target box (as shown in FIG. 4). The processing unit 10 performs a first scanning procedure to the depth graph for determining the position of the target box in the depth graph. In more detail, the processing unit 10 generates multiple scanning lines (including multiple vertical scanning lines and multiple horizontal scanning lines) through the algorithm, and then performs the first scanning procedure to the depth graph according to the multiple scanning lines, so as to retrieve (or determine) a middle line, a bottom line, a left-side line, a right-side line, etc. (as shown in FIG. 9B and FIG. 9D) of the target box in the depth graph. Therefore, the processing unit 10 may determine the position of the target box in the depth graph (based on the reference lines, i.e., the middle line, the bottom line, the left-side line, the right-side line, etc.).

While performing the first scanning procedure, the processing unit 10 uses the multiple vertical scanning lines and the multiple horizontal scanning lines to statistically gather the depth information of each point in the depth graph, and distinguishes the target box from the background according to the depth differences of the adjacent points, and distinguishes the boundaries and faces of the target box according to the depth differences of the adjacent points. Therefore, the processing unit 10 may obtain the middle line, the bottom line, the left-side line, and the right-side line of the target box. After obtaining the middle line, the bottom line, the left-side line, and the right-side line, the processing unit 10 may determine the specific position of the target box in the depth graph.

Figure 11A:
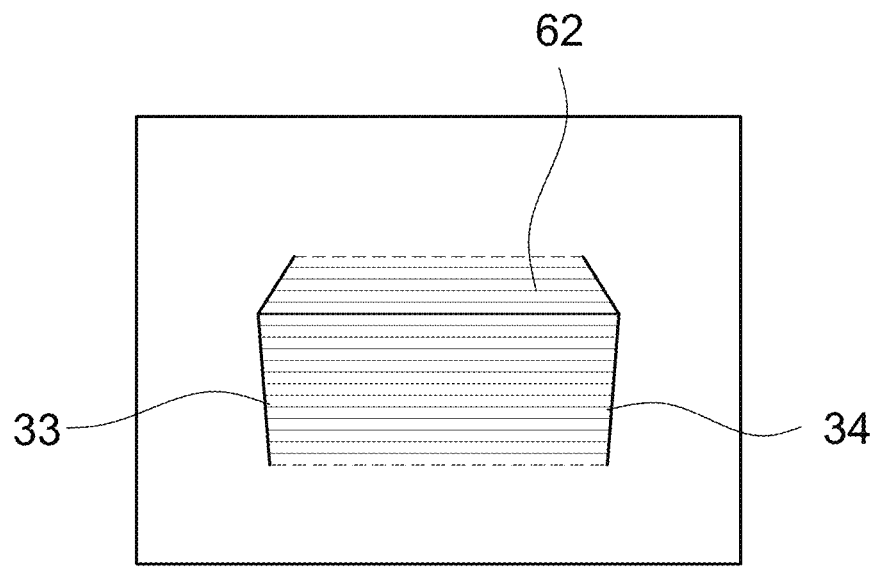
FIG. 11A is a first acting diagram showing a volume related data determination according to the present invention.
Figure 11B:
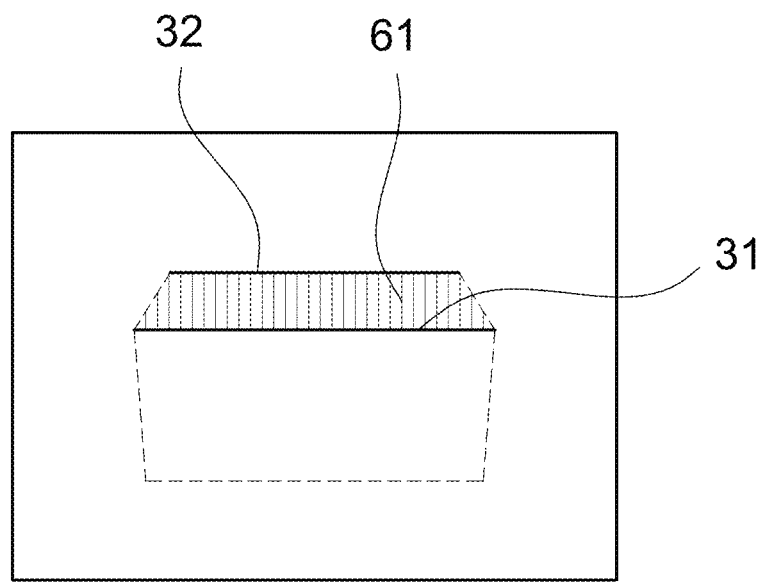
FIG. 11B is a second acting diagram showing the volume related data determination according to the present invention.
Figure 11C:
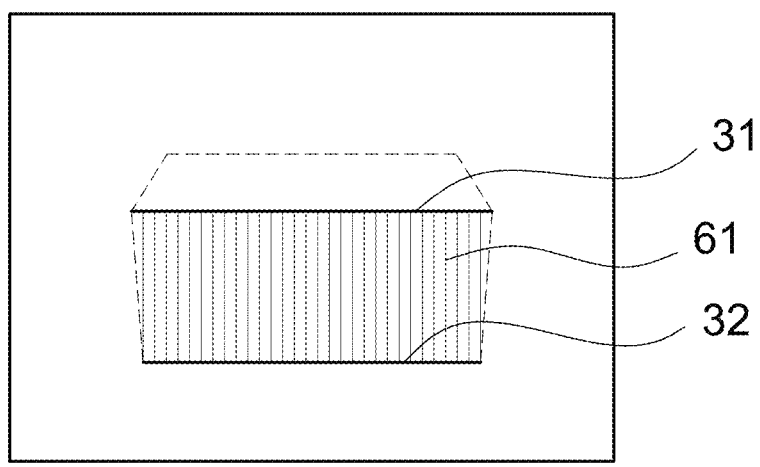
FIG. 11C is a third acting diagram showing the volume related data determination according to the present invention.

The processing unit 10 may perform a second scanning procedure to the target box in the depth graph, so as to obtain the volume related data such as a width, a height, a length, etc. of the target box. In particular, while performing the second scanning procedure, the processing unit 10 defines (or uses) the middle line, the bottom line, the left-side line, and the right-side line as a scanning range, and directly scans the target box in the depth graph within the scanning range through the multiple scanning lines (including the vertical scanning lines and the horizontal scanning lines), so as to obtain multiple width information, height information, and length information (as shown in FIG. 11A, FIG. 11B, and FIG. 11C) from the scanning result.

The processing unit 10 may compute (or calculate) the volume related data, such as an actual width, an actual height, and an actual length, of the target box respectively according to the multiple width information, the multiple height information, and the multiple length information. For example, the processing unit 10 may calculate an average of the multiple width information for obtaining the actual width of the target box, calculate an average of the multiple height information for obtaining the actual height of the target box, and calculate an average of the multiple records of length information for obtaining the actual length of the target box. The above description is only one of the exemplary embodiments of the present invention, not limited thereto.

It is should be noted that the measuring apparatus 1 of the present invention may further include a structure light emitting unit 14 electrically connected with the processing unit 10. In the embodiment, the structure light emitting unit 14, the first camera 11, and the second camera 12 are arranged on same side (or surface) of the shell 2 (such as the first surface of the shell 2). The structure light emitting unit 14 is a light emitter which may be regarded as a light source and may provide light to an external environment of the measuring apparatus 1. In one of the exemplary embodiments, when the structure light emitting unit 14 is triggered (for example, trigged by a triggering unit 13, or activated by the processing unit 10), the structure light emitting unit 14 emits invisible structure light to the external environment, and one or multiple sets of reference pattern may be formed by the emitted structure light. With respect to the one or multiple sets of reference pattern, the processing unit 10 may generate the depth graph quickly and accurately.

Please refer to FIG. 4, FIG. 4 is a schematic diagram showing a generation of a depth graph of a first embodiment according to the present invention. When the structure light emitting unit 14 is triggered, the structure light emitting unit 14 emits invisible structure light to the external environment, and one or multiple sets of reference pattern 141 are formed by the invisible structure light. In the embodiment, the reference pattern 141 is projected onto the target box 3. When the reference pattern 141 is projected by the structure light emitting unit 14, the processing unit 10 controls the first camera 11 and the second camera 12 to respectively capture a left image 41 and a right image 42. The left image 41 and the right image 42 respectively contain the image of the target box 3 and the image of the reference pattern 141 covering the target box 3 (i.e., the reference pattern 141 covering the target box 3 may be regarded as the aforementioned reference information).

In this embodiment, the processing unit 10 performs a computation (or calculation) based on the images of the target box 3 and the reference patterns 141 in the left image 41 and right image 42 through the depth transforming algorithm, so as to generate a depth graph 5 corresponding to the target box 3.

In particular, the one or multiple sets of reference pattern 141 are constituted by multiple identifiable elements such as points, shapes, pictures, texts, symbols, etc. While the processing unit 10 is generating the depth graph 5, the processing unit 10 searches for same element in the left image 41 and the right image 42 respectively, and calculates corresponding depth information of each element according to the position differences of each element in the left image 41 and in the right image 42. The processing unit 10 may generate the depth graph 5 according to the corresponding depth information of each element. As a result, the depth graph 5 in this embodiment may be more accurate than the depth graph generated without reference pattern 141.

As shown in FIG. 1 and FIG. 2, the measuring apparatus 1 may further include a triggering unit 13 electrically connected with the processing unit 10. The triggering unit 13 is arranged at a hand-hold position on the measuring apparatus 1 and exposed from the measuring apparatus 1. In one of the exemplary embodiments, the triggering unit 13 is a physical button, and the user may press the triggering unit 13 to activate the measuring function of the measuring apparatus 1.

In more detail, when the triggering unit 13 receives an external operation from the user (for example being pressed by the user), the processing unit 10 is triggered to control the structure light emitting unit 14 to emit the invisible structure light for forming the reference pattern 141. The processing unit 10 is also triggered by the triggering unit 13 to control the first camera 11 and the second camera 12 to respectively capture the left image 41 and the right image 42. Hence, the processing unit 10 may perform the aforementioned computation (or calculation) based on the left image 41 and the right image 42 for obtaining the volume related data of the target box contained in the left image 41 and the right image 42.

As shown in FIG. 1 and FIG. 2, the measuring apparatus 1 in the present invention may further include a guiding unit 15 electrically connected with the processing unit 10. In the embodiment, the guiding unit 15, the first camera 11, and the second camera 12 are arranged on same side (or surface) of the shell 2 (such as the first surface of the shell 2). In one of the exemplary embodiments, the guiding unit 15 may emit laser beam to the external environment after being triggered (for example being triggered by the triggering unit 13, or being activated by the processing unit 10). The user may regard the laser beam as a guidance and aim the measuring apparatus 1 at the target box with respect to the laser beam. Therefore, the first camera 11 and the second camera 12 may capture the left image and the right image for the processing unit 10 to process effectively.

Figure 3:
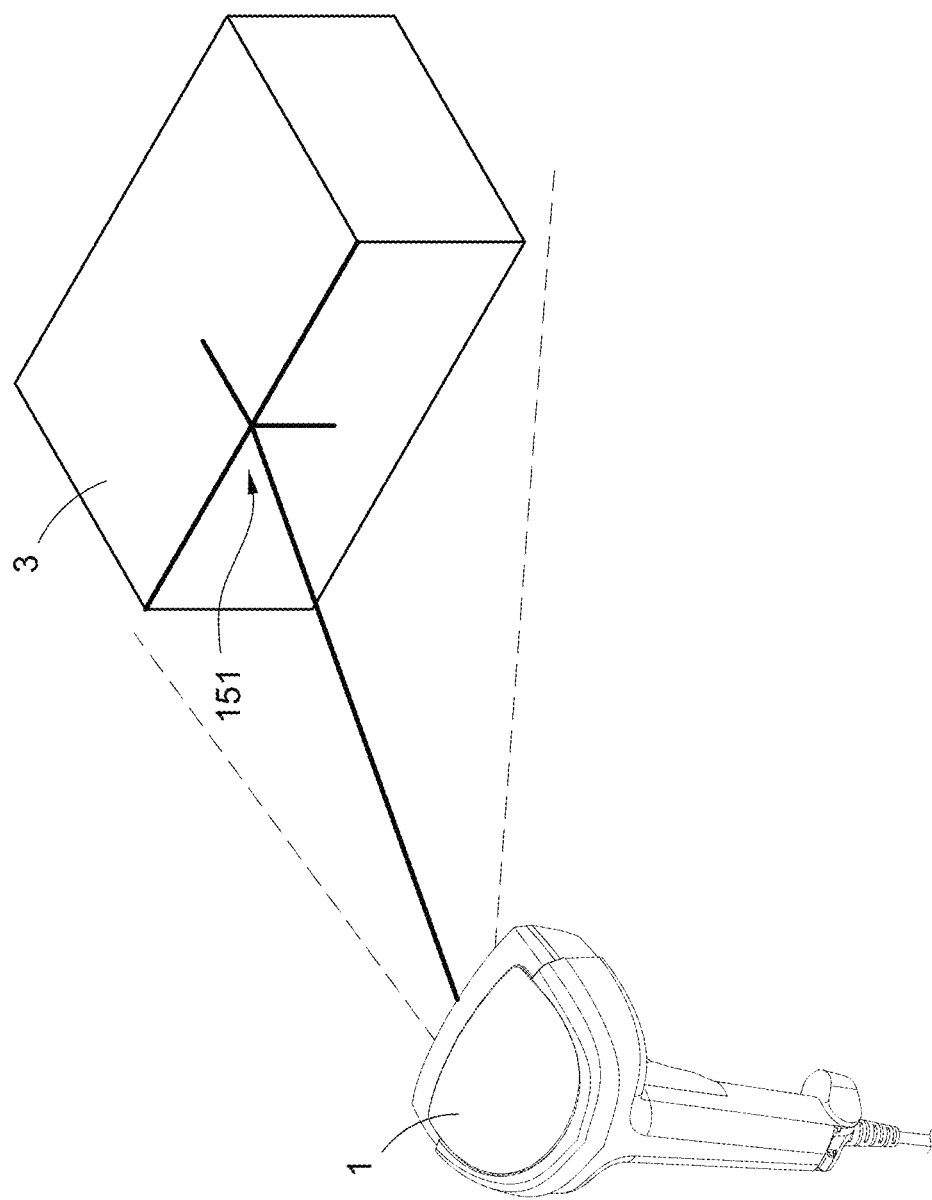
FIG. 3 is a schematic diagram showing a measuring scenario of a first embodiment according to the present invention.

Please refer to FIG. 3, FIG. 3 is a schematic diagram showing a measuring scenario of a first embodiment according to the present invention. A laser beam is emitted when the guiding unit 15 is triggered, and a cross guiding object 151 is formed by the laser beam. While measuring, the user may use the guiding object 151 to aim the target box 3 to be measured, so as to assist the first camera 11 and the second camera 12 to capture useful and effective images (i.e., the left image 41 and the right image 42 as mentioned above).

More specific, a manufacturer of the measuring apparatus 1 may preset parameters of the measuring apparatus 1 while manufacturing, such that the parameters like focal length, FoV, and resolution of the first camera 11 and the second camera 12 may be related to the size and shape of the guiding object 151. When the user moves while holding the measuring apparatus 1, the user may align a horizontal line of the guiding object 151 emitted by the guiding unit 15 with the middle line of the target box 3, and the user may adjust the distance between the measuring apparatus 1 and the target box 3 for the horizontal line of the guiding object 151 to be equal to or greater than the width of the target box 3, so as to have the target box 3 to be located in an effective image capturing range of the first camera 11 and the second camera 12. In this situation, the first camera 11 and the second camera 12 may respectively capture an effective left image and an effective right image.

In other embodiment, the processing unit 10 may use the relation of the guiding object 151 and the target box 3 as a triggering basis. In particular, the processing unit 10 in this embodiment may control the guiding unit 15 to emit the guiding object 151, and continually determines whether the horizontal line of the guiding object 151 is aligned with the middle line of the target box 3, and whether the horizontal line of the guiding object 151 is equal to or greater than the width of the target box 3. The processing unit 10, in this embodiment, may automatically control the structure light emitting unit 14 to emit the reference pattern 141 and control the first camera 11 and the second camera 12 to capture the left image and the right image when the horizontal line of the guiding object 151 is aligned with the middle line of the target box 3 and is equal to or greater than the width of the target box 3. The above description is only one of the exemplary embodiments of the present invention, not limited thereto.

As shown in FIG. 2, the measuring apparatus 1 of the present invention may further include a displaying unit 16 electrically connected with the processing unit 10. When the measuring apparatus 1 captures the left image 41 and the right image 42 through the first camera 11 and the second camera 12, the measuring apparatus 1 may directly display the left image 41 and the right image 42 on the displaying unit 16. Also, after calculating the volume related data of the target box 3 such as width, height, and length, the measuring apparatus 1 may directly display the volume related data of the target box 3 on the displaying unit 16. By applying the displaying unit 16, the user may complete the overall measuring action via the measuring apparatus 1 without any other electronic devices.

As shown in FIG. 2, the measuring apparatus 1 of the present invention may further include a transmitting unit 17 electrically connected with the processing unit 10. The transmitting unit 17 may be, but not limited to, a wired transmitting module (such as a USB port, an HDMI port, etc.) or a wireless transmitting module (such as a Bluetooth module, a WiFi module, an NFC module, etc.). In this embodiment, the measuring apparatus 1 may connect with an external electronic device (not shown in figures) through the transmitting unit 17, and transmit the left image 41 captured by the first camera 11, the right image 42 captured by the second camera 12, the volume related data calculated by the processing unit 10, etc., to the electronic device for displaying. Therefore, the user may monitor all the information with respect to the target box 3 on the electronic device which connects and communicates with the measuring apparatus 1.

As shown in FIG. 2, the measuring apparatus 1 of the present invention may further include a printing unit 18 electrically connected with the processing unit 10. In one of the exemplary embodiments, the processing unit 10 may print the volume related data of the target box 3 through the printing unit 18 instead of displaying through the displaying unit 16 or the electronic device. Therefore, the user may obtain a paper record of the volume related data for collecting and following application.

As shown in FIG. 2, the measuring apparatus 1 of the present invention may further include a storage unit (such as a memory) 19 electrically connected with the processing unit 10. The storage unit 19 may store a look up table 191. The look up table 191 includes (which is memorized in the storage unit 19) the relations between a plurality of the volume related data and multiple fees. In one of the exemplary embodiments, when the volume related data is calculated, the processing unit 10 may inquire the look up table 191 according to the volume related data, so as to obtain a fee required for processing the target box 3 (for example, a packaging fee, a transportation fee, etc.). Besides, the fee may be displayed through the displaying unit 16 or the electronic device, or printed through the printing unit 18.

Figure 5:
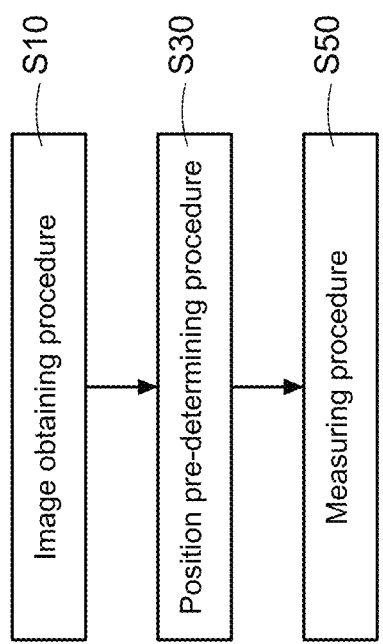
FIG. 5 is a measuring flowchart of a first embodiment according to the present invention.

FIG. 5 is a measuring flowchart of a first embodiment according to the present invention. The present invention further discloses a volume measuring method for a box (referred to as the measuring method hereinafter), the measuring method is applied to the measuring apparatus 1 as shown in FIG. 1 and FIG. 2.

As shown in FIG. 5, the measuring method of the present invention includes an image obtaining procedure for obtaining images as computation (or calculation) basis (step S10), a position pre-determining procedure for determining the position of the target box 3 in the images (step S30), and a measuring procedure for actually determining the volume related data of the target box 3 (step S50).

It should be noted that, in addition to the above procedures, the measuring method of the present invention may further include a data verifying procedure optionally executed by the processing unit 10 for verifying the volume related data (for example, the processing unit 10 may calculate the volume related data of the target box 3 for multiple times, and compares the similarity of the multiple results of the volume related data in order to verify the accuracy of the volume related data), a data displaying procedure for displaying the calculated volume related data (for example, displaying the volume related data through the displaying unit 16 or the external electronic device), a data printing procedure for printing the volume related data (for example, printing the volume related data through the printing unit 18), etc., but not limited thereto.

In particular, the measuring method of the present invention relates to a technical solution which determines the volume related data of the target box 3 based on the depth information of the captured images. In the embodiment, the aforementioned image obtaining procedure is to generate the depth graph 5 as a calculation basis of the processing unit 10, the aforementioned position pre-determining procedure is to determine whether a rectangular object is located in the depth graph 5 and retrieve multiple boundary lines of the rectangular object when the rectangular object is located, and the measuring procedure is to calculate the volume related data including the width, the height, and the length of the rectangular object based on the multiple boundary lines of the rectangular object.

Figure 6:
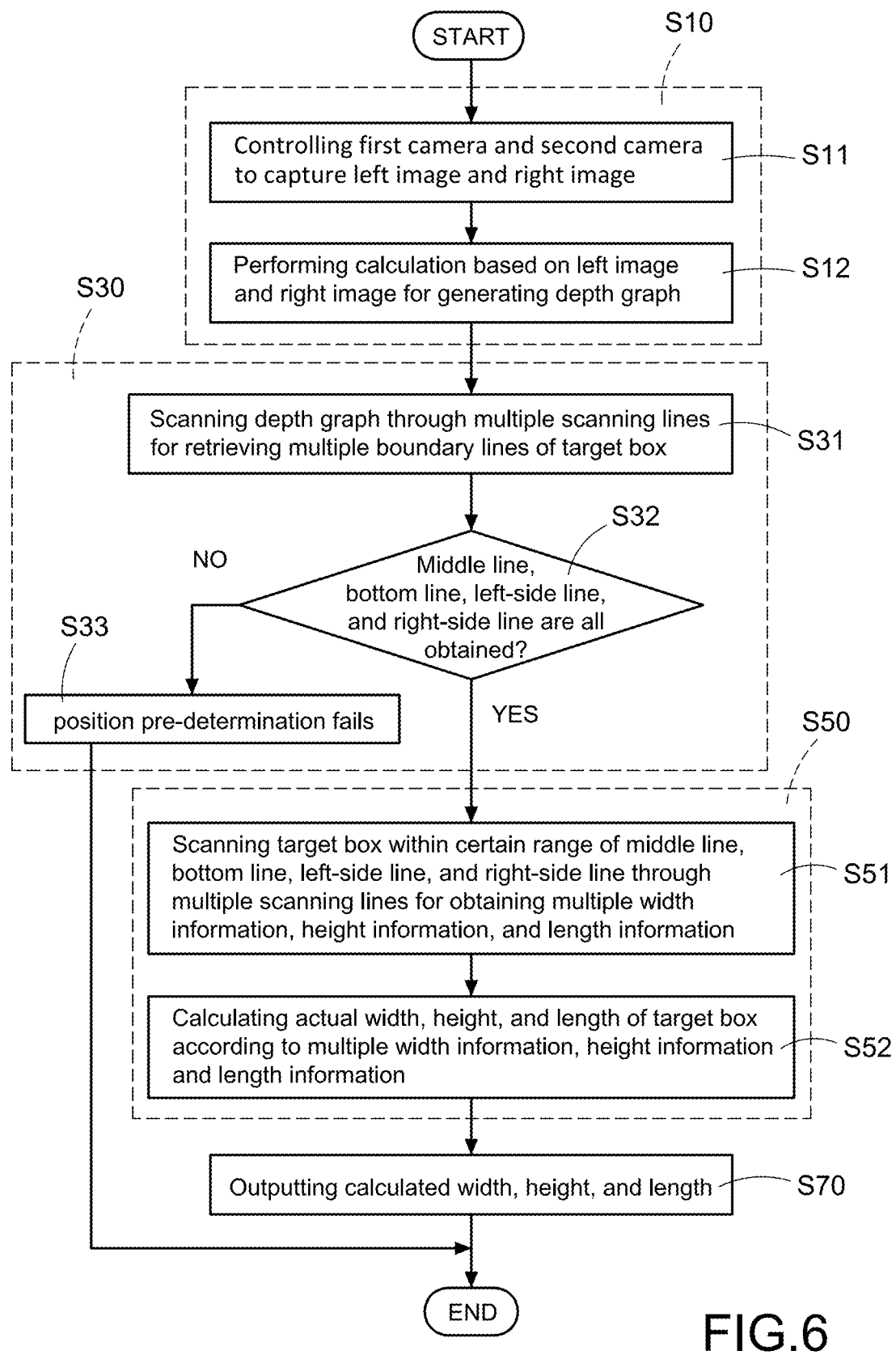
FIG. 6 is a measuring flowchart of a second embodiment according to the present invention.

Please refer to FIG. 6, which is a measuring flowchart of a second embodiment according to the present invention. As shown in FIG. 6, in the image obtaining procedure (step S10), the measuring apparatus 1 receives operation from the user through the triggering unit 13, and triggers the processing unit 10 to control the first camera 11 to capture a left image 41 and the second camera 12 to capture a right image 42 (step S11). As shown in FIG. 4, the left image 41 and the right image 42 at least contain an image of the entire target box 3.

In one embodiment, the processing unit 10 may control the structure light emitting unit 14 to emit invisible structure light to the external environment after being triggered, and the reference pattern 141 is formed on the target box 3 through the invisible structure light. The processing unit 10 controls the first camera 11 and the second camera 12 to respectively capture the left image 41 and the right image 42. In other words, both the left image 41 and the right image 42 in this embodiment contain the image of the entire target box 3 and the image of the reference pattern 141 around the target box 3.

The processing unit 10 performs a calculation to the left image 41 and the right image 42 through a depth transforming algorithm for generating a depth graph 5 (step S12) correspondingly. As shown in FIG. 4, the left image 41 contains the image of the entire target box 3 and the image of the reference pattern 141, the right image 42 contains the image of the entire target box 3 and the image of the reference pattern 141, and the depth graph 5 at least contains depth information of the target box 3 and depth information of the background around the target box 3.

In the position pre-determining procedure (step S30), the processing unit 10 generates multiple scanning lines through executing an algorithm (such as the depth transforming algorithm). The multiple scanning lines may be, for example, the multiple vertical scanning lines 61 as shown in FIG. 9A and the multiple horizontal scanning lines 62 as shown in FIG. 9C. The processing unit 10 may scan the depth graph 5 generated from the step S12 through the multiple scanning lines for retrieving (or determining) multiple boundary lines of the target box 3 (step S31). In this embodiment, the boundary lines at least include the middle line, the bottom line, the left-side line, and the right-side line of the target box 3 (for example, the middle line 31 and the bottom line 32 as shown in FIG. 9B, and the left-side line 33 and the right-side line 34 as shown in FIG. 9D).

It should be noted that the bottom line 32 may be a lower-bottom line of the target box 3 or an upper-bottom line of the target box 3. In other embodiment, the processing unit 10 may scan the target box 3 to retrieve the lower-bottom line and the upper-bottom line of the target box 3 simultaneously, not limited thereto.

After the step S31, the processing unit 10 determines whether the middle line, the bottom line, the left-side line, and the right-side line of the target box 3 are obtained (step S32), and the processing unit 10 determines that a position pre-determination for determining the position of the target box 3 fails if any one of the middle line, the bottom line, the left-side line, and the right-side line is not obtained (step S33). If the position pre-determination fails, it indicates that the target box 3 is not located in the depth graph 5, or the position of the target box 3 is inappropriate for measurement (for example, the target box 3 is put closely to wall and has similar depth with the wall), so the processing unit 10 stops performing the following measuring procedure. On the other hand, the processing unit 10 determines that the position pre-determination succeeds when the middle line, the bottom line (one of the upper-bottom line and the lower-bottom line), the left-side line, and the right-side line of the target box 3 are obtained, and the processing unit 10 proceeds to perform the measuring procedure to measure the volume related data of the target box 3.

In the measuring procedure (step S50), the processing unit 10 scans the target box 3 in the depth graph 5 within a range of the middle line, the bottom line, the left-side line, and the right-side line through the multiple scanning lines to obtain multiple width information, multiple height information, and multiple length information of the target box 3 (step S51). The processing unit 10 calculates the actual volume related data of the target box 3 according to the multiple width information, the multiple height information and the multiple length information (step S52). In this embodiment, the volume related data at least includes the width, the height, and the length of the target box 3.

After the step S52, the processing unit 10 outputs the calculated width, height, and length of the target box 3 (step S70). For example, the processing unit 10 displays the data through the displaying unit 16, or prints the data through the printing unit 18, or transmits the data to an external electronic device for displaying, not limited thereto.

It should be noted that, when the width, the height, and the length of the target box 3 are calculated, the processing unit 10 may further inquire the look up table 191 stored in the storage unit 19 according to the volume related data, so as to obtain a corresponding fee, such as a packaging fee, a transportation fee, or a mailing fee, of the target box 3, and displays the corresponding fee through the displaying unit 16 or the external electronic device, or prints the corresponding fee through the printing unit 18. Therefore, the user may easily use the measuring apparatus 1 and measuring method provided by the present invention.

Figure 7:
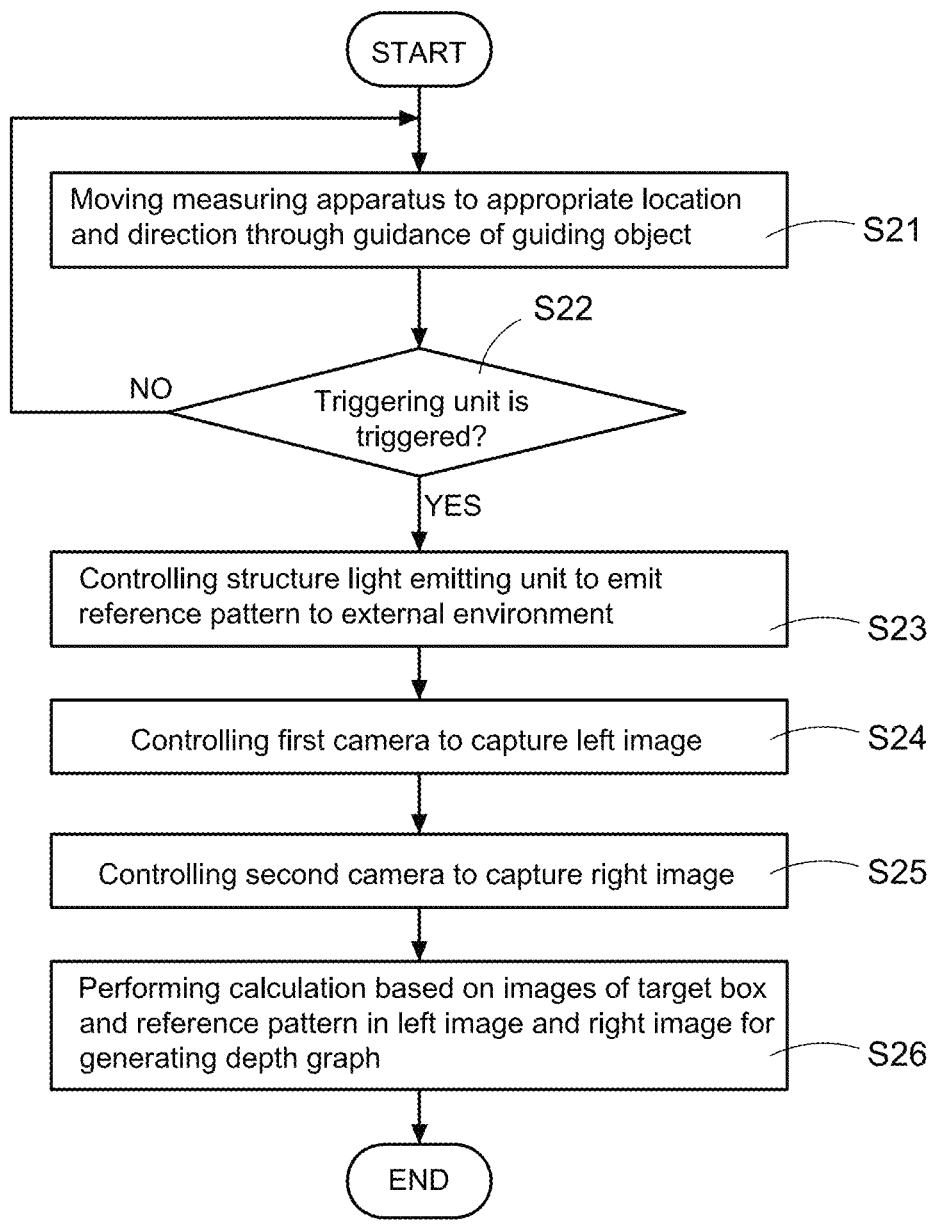
FIG. 7 is a flowchart of generating a depth graph of a first embodiment according to the present invention.

FIG. 7 is a flowchart for generating a depth graph of a first embodiment according to the present invention. FIG. 7 is used to specifically describe the image obtaining procedure in the measuring method of the present invention.

As disclosed in FIG. 7, if the measuring apparatus 1 includes the guiding unit 15, the processing unit 10 may be operated by the user to control the guiding unit 15 to emit laser beam for forming a cross guiding object 151. The user may move the measuring apparatus 1 to an appropriate location and direction (step S21) referring to the position and the shape of the guiding object 151. The processing unit 10 continually determines whether the triggering unit 13 is triggered by the user or not (step S22), and controls the guiding unit 15 to keep emitting the guiding object 151 before the triggering unit 13 is triggered, and proceeds to capture images when the triggering unit 13 is triggered.

When the triggering unit 13 is triggered, the processing unit 10 controls the structure light emitting unit 14 to emit the reference pattern 141 to the external environment by the invisible structure light (step S23). The reference pattern 141 is projected onto the target box 3. The processing unit 10 controls the first camera 11 to capture the left image 41 (step S24), and controls the second camera 12 to capture the right image 42 (step S25). In the embodiment, the left image 41 contains both the image of the entire target box 3 and the image of the reference pattern 141, and the right image 42 contains both the image of the entire target box 3 and the image of the reference pattern 141. The image of the reference pattern 141 covers the image of the target box 3 (as shown in FIG. 4).

After the step S25, the processing unit 10 may generate a depth graph 5 correspondingly through performing a calculation to the images of the target box 3 and the reference pattern 141 in the left image 41 and the right image 42 (step S26). The depth information of the target box 3 and the depth information of the background around the target box 3 are recorded in the depth graph 5.

In one of the exemplary embodiments, the user may operate the measuring apparatus 1 and trigger the triggering unit 13 when a horizontal line of the guiding object 151 is aligned with the middle line of the target box 3 and the length of the horizontal line is equal to or greater than the width of the target box 3. When the triggering unit 13 is triggered, the processing unit 10 controls the structure light emitting unit 14 to emit the reference pattern 141, and controls the first camera 11 and the second camera 12 to respectively capture the left image 41 and the right image 42.

In other embodiment, the processing unit 10 may continually check (or determine) the distance and the relative positions between the guiding object 151 and the target box 3, and automatically controls the structure light emitting unit 14, the first camera 11, and the second camera 12 when the horizontal line of the guiding object 151 is aligned with the middle line of the target box 3 and the length of the horizontal line is equal to or greater than the width of the target box 3. The above descriptions are only few embodiments of the present invention, not limited thereto.

Figure 8:
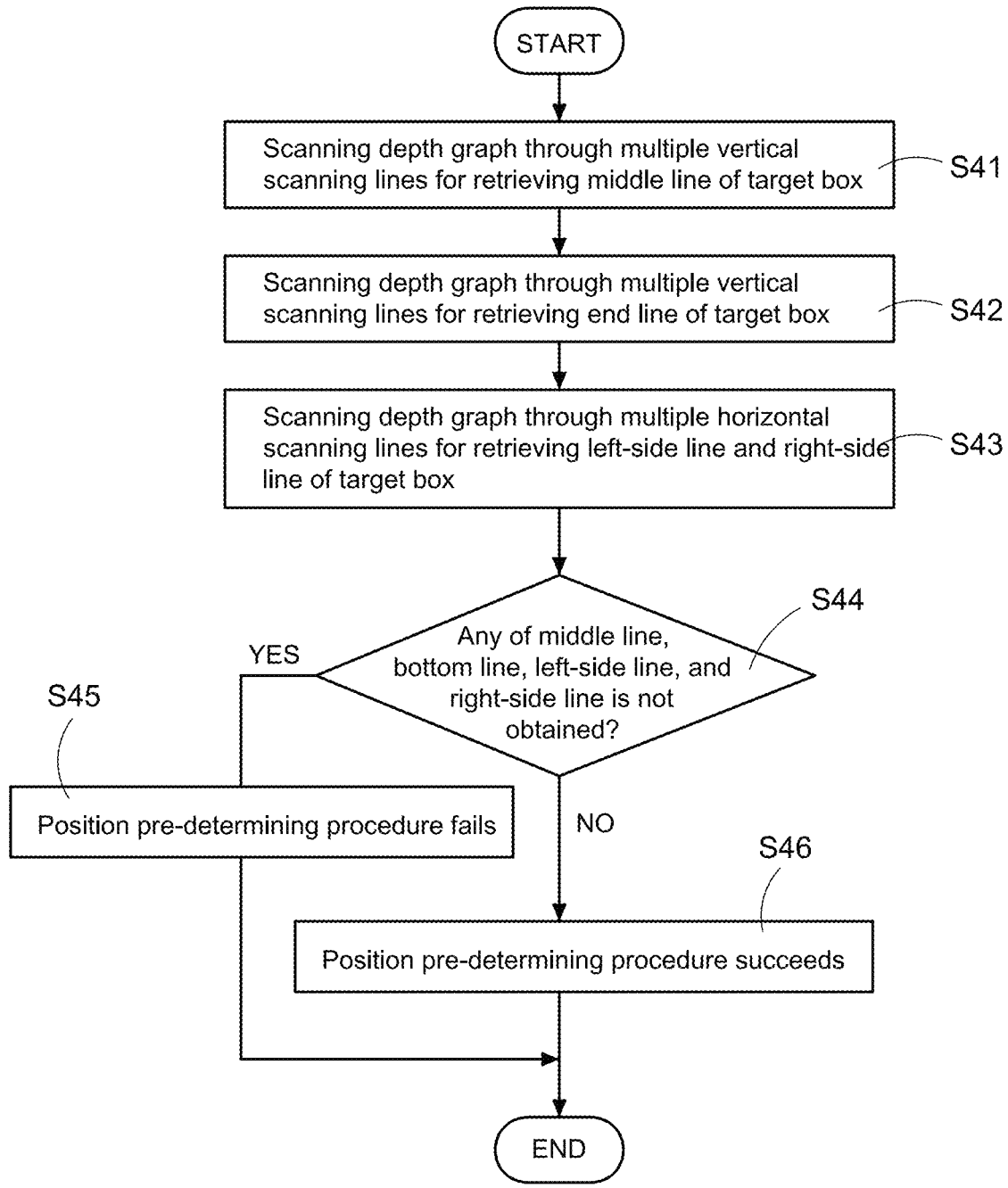
FIG. 8 is a flowchart of pre-determining a box position of a first embodiment according to the present invention.

Please refer to FIG. 8, FIG. 9A, FIG. 9B, FIG. 9C, and FIG. 9D. FIG. 8 is a flowchart for pre-determining a box position of a first embodiment according to the present invention, FIG. 9A to FIG. 9D are first acting diagram to fourth acting diagram respectively showing a box boundary determination according to the present invention. FIG. 8 is used to specifically describe the position pre-determining procedure in the measuring method of the present invention.

Refer to FIG. 8, FIG. 9A, and FIG. 9B. When the depth graph 5 is obtained, the processing unit 10 generates multiple vertical scanning lines 61 through executing an algorithm (such as the depth transforming algorithm), and performs a scanning procedure to the depth graph 5 through the multiple vertical scanning lines 61 for retrieving (or determining) the middle line 31 of the target box 3 (step S41). The processing unit 10 performs the scanning procedure to the depth graph 5 through the multiple vertical scanning lines 61 for retrieving the bottom line(s) 32 of the target box 3 (step S42). In one of the exemplary embodiments, the bottom line(s) 32 may be an upper-bottom line or a lower-bottom line of the target box 3. For better understanding, a lower-bottom line 32 of the target box 3 is used as an example in FIG. 9B, but not limited thereto.

It is worth saying that, as shown in FIG. 9A, the processing unit 10 searches for multiple characteristic points 310, 320 which match with certain conditions in the depth graph 5 through the multiple vertical scanning lines 61, and connects these characteristic points 310 which match with a first condition to form the middle line 31 of the target box 3, and connects these characteristic points 320 which match with a second condition to form the bottom line 32 of the target box 3.

In particular, the boundary lines of the target box 3 have specific characteristics, so the processing unit 10 may determine multiple points which match with the characteristics as the characteristic points 310, 320 as mentioned above. For example, the processing unit 10 may determine the shallowest points comparing to the adjacent points on each vertical scanning line 61 as the characteristic points 310, determine the deepest points comparing to the adjacent points on each vertical scanning line 61 as the characteristic points 320, or determine the points, on each vertical scanning lines 61, having greatest depth difference with the adjacent points as the characteristic points of the upper-bottom line. The above description is only one of the exemplary embodiments, but not limited to the above embodiment.

As shown in FIG. 8, FIG. 9C, and FIG. 9D, when the depth graph 5 is obtained, the processing unit 10 may generate multiple horizontal scanning lines 62 through executing an algorithm (such as the depth transforming algorithm), and perform a scanning procedure to the depth graph 5 through the multiple horizontal scanning lines 62 for retrieving (or determining) the left-side line 33 and the right-side line 34 of the target box 3 (step S43). In the present invention, the processing unit 10 may retrieve the middle line 31, the bottom line 32, the left-side line 33, and the right-side line 34 of the target box 3 in different order depending on the demand, no strict executing order is imposed to the aforementioned steps S41 to S43 in the measuring method of the present invention.

Similar to the disclosure of FIG. 9A, the processing unit 10 in the step S43 searches for multiple characteristic points 330, 340 which match with certain conditions in the depth graph 5 through the multiple horizontal scanning lines 62, and connects these characteristic points 330 which match with a third condition to form the left-side line 33 of the target box 3, and connects these characteristic points 340 which match with a fourth condition to form the right-side line 34 of the target box 3. For example, the processing unit 10 may determine, on each horizontal scanning line 62, the points having greatest depth difference with the adjacent points as the characteristic points 330 or 340, but not limited thereto.

After the step S41, the step S42, and the step S43, the processing unit 10 determines whether any of the middle line 31, the bottom line 32, the left-side line 33, and the right-side line 34 of the target box 3 may not be successfully obtained (step S44), determines that the position pre-determining procedure fails if any one of the boundary lines of the target box 3 is not obtained (step S45), and determines that the position pre-determining procedure succeeds when every boundary line of the target box 3 are obtained (step S46). If the position pre-determining procedure succeeds, it means that the position of the target box 3 in the depth graph 5 is determined.

If the position pre-determining procedure fails, the processing unit 10 in this embodiment stops determining and the following measuring procedure. On the other hand, if the position pre-determining procedure succeeds, the processing unit 10 proceeds to perform the measuring procedure for calculating the volume related data of the target box 3 according to the retrieved middle line 31, the bottom line 32, the left-side line 33, and the right-side line 34 of the target box 3.

Figure 10:
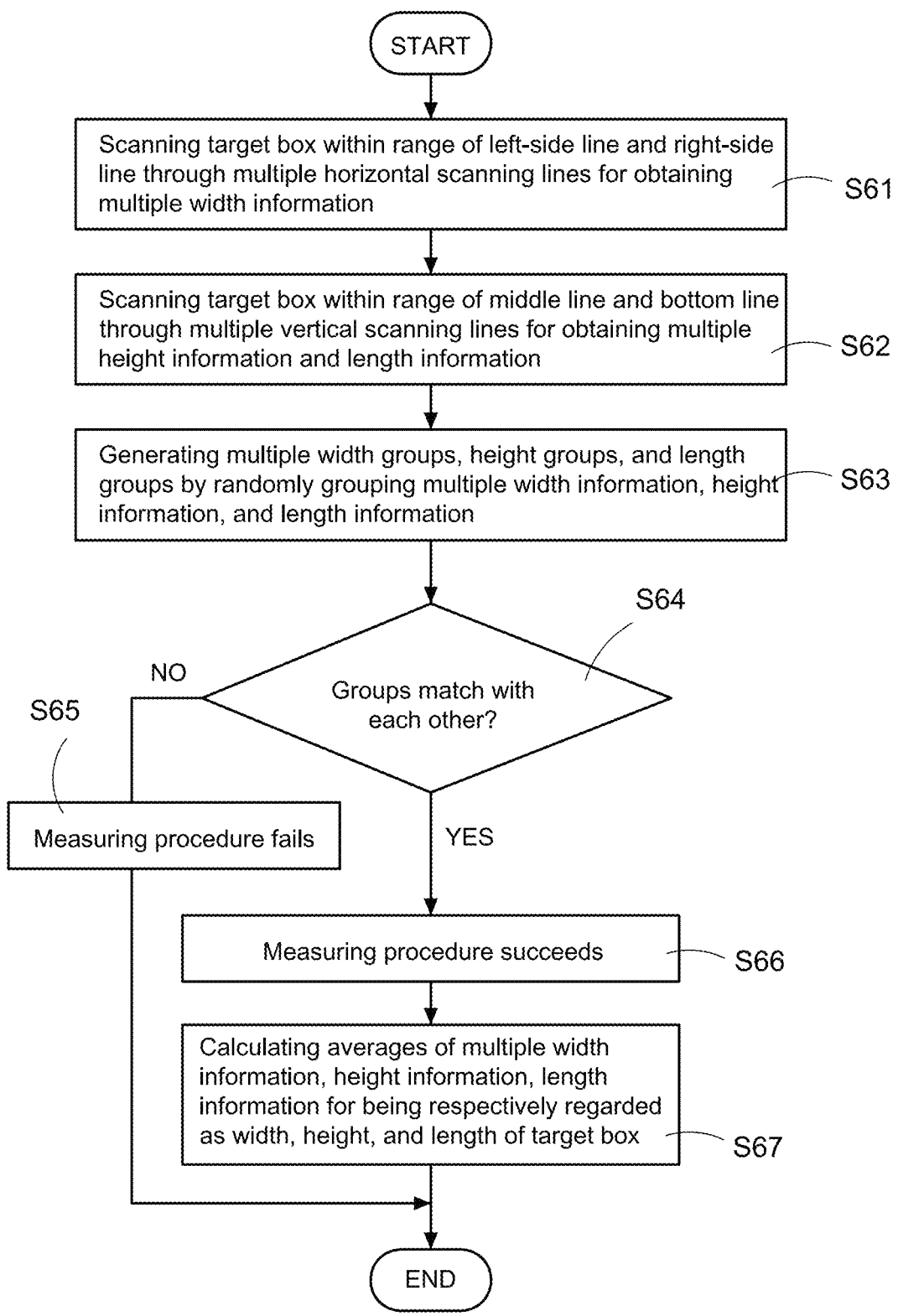
FIG. 10 is a flowchart of determining a volume related data of a first embodiment according to the present invention.

Please refer to FIG. 10, FIG. 11A, FIG. 11B, and FIG. 11C. FIG. 10 is a flowchart for determining volume related data of a first embodiment according to the present invention, and FIG. 11A to FIG. 11C are first acting diagram to third acting diagram respectively showing a volume related data determination according to the present invention. FIG. 10 is used to specifically describe the measuring procedure in the measuring method of the present invention.

As shown in FIG. 11A to FIG. 11C, when the position of the target box 3 in the depth graph 5 is confirmed, the processing unit 10 uses the middle line 31, the bottom line 32 (the lower-bottom line and/or the upper-bottom line), the left-side line 33, and the right-side line 34 as a scanning range for a second scanning procedure. By performing the second scanning procedure within the scanning range, the width, the height, and the length of the target box 3 may be calculated.

In one of the exemplary embodiments, the processing unit 10 generates and applies multiple horizontal scanning line 62 to scan the target box 3 within a range of the left-side line 33 and the right-side line 34, so as to obtain multiple width information of the target box 3 (step S61).

As shown in FIG. 11A, the processing unit 10 uses one characteristic point 330 upon the left-side line 33 as a start point of the horizontal scanning point 62, uses one characteristic point 340 upon the right-side line 34 as an end point of the horizontal scanning line 62, and uses a distance from the start point to the end point upon the horizontal scanning line 62 as one width information. After performing the second scanning procedure to the target box 3 through multiple horizontal scanning lines 62, the processing unit 10 may obtain multiple width information.

Similarly, the processing unit 10 may generate and apply multiple vertical scanning line 61 to scan the target box 3 within a range of the middle line 31 and the bottom line 32, so as to obtain multiple height information and multiple length information of the target box 3 (step S62).

As shown in FIG. 11B, the processing unit 10 uses one characteristic point 320 upon the bottom line 32 (an upper-bottom line in FIG. 11B) as a start point of the vertical scanning point 61, uses one characteristic point 310 upon the middle line 31 as an end point of the vertical scanning line 61, and uses a distance from the start point to the end point upon the vertical scanning line 61 as one height information. After performing the second scanning procedure to the target box 3 through multiple vertical scanning lines 61, the processing unit 10 may obtain multiple height information.

As shown in FIG. 11C, the processing unit 10 uses one characteristic point 310 upon the middle line 31 as a start point of the vertical scanning point 61, uses one characteristic point 320 upon the bottom line 32 (a lower-bottom line in FIG. 11C) as an end point of the vertical scanning line 61, and uses a distance from the start point to the end point upon the vertical scanning line 61 as one length information. After performing the second scanning procedure to the target box 3 through multiple vertical scanning lines 61, the processing unit 10 may obtain multiple length information.

It should be noted that, each characteristic point upon the upper-bottom line of the target box 3 has huge depth difference comparing to the adjacent point in the background, hence, even the processing unit 10 does not retrieve the position of the upper-bottom line of the target box 3 during the above position pre-determining procedure, the algorithm may still determine the position of each characteristic point upon the upper-bottom line and calculate the multiple length information in the step S62.

In the present invention, the processing unit 10 may calculate the width information, height information, and length information of the target box 3 in any order depending on the demand, a strict executing order is not imposed to the step S61 and the step S62.

When the multiple of width information, height information, and length information are obtained, the processing unit 10 randomly groups the multiple width information for generating multiple width groups, randomly groups the multiple height information for generating multiple height groups, and randomly groups the multiple length information for generating multiple length groups (step S63). The processing unit 10 determines whether the width groups (i.e., multiple widths) match with each other, whether the height groups (i.e., multiple heights) match with each other, and whether the length groups (i.e., multiple lengths) match with each other (step S64).

For an instance, the processing unit 10 may select a first, a fourth, a seventh and a tenth width information of the multiple width information as a first width group, select a second, a fifth, an eighth and an eleventh width information of the multiple width information as a second width group, select a third, a sixth, a ninth and a twelfth width information of the multiple width information as a third width group, and select the fourth, the seventh, the tenth and a thirteenth width information of the multiple width information as a fourth width group. The processing unit 10 calculates a sum or an average of width of the first width group, calculates a sum or an average of width of the second width group, calculates a sum or an average of width of the third width group, and calculates a sum or an average of width of the fourth width group. After that, the processing unit 10 compares these sums or averages with each other, and determines that the width groups match with each other if the differences of these sums or averages are smaller than a pre-determined tolerance value.

If the processing unit 10 determines that any of the multiple width groups, the multiple height groups, and the multiple length groups are not matched, the processing unit 10 determines that the measuring procedure fails (step S65). On the contrary, if the processing unit 10 determines that the multiple width groups are all matched with each other, the multiple height groups are all matched with each other, and the multiple length groups are all matched with each other, the processing unit 10 determines that the measuring procedure succeeds (step S66).

If the measuring procedure succeeds, the processing unit 10 respectively calculates an average of the multiple width information, calculates an average of the multiple height information, and calculates an average of the multiple length information, and the processing unit 10 uses these averages respectively as the volume related data of the target box 3 (step S67). In particular, the processing unit 10 uses the average of the multiple width information as a width of the target box 3, uses the average of the multiple height information as a height of the target box 3, and uses the average of the multiple length information as a length of the target box 3.

By way of the measuring apparatus 1 and the measuring method of the present invention, the staffs of the warehousing companies and transportation companies may measure the volume of any kind of boxes anytime and anywhere, which is convenient for the users.

As the skilled person will appreciate, various changes and modifications can be made to the described embodiment. It is intended to include all such variations, modifications and equivalents which fall within the scope of the present invention, as defined in the accompanying claims.

What is claimed is:

1. A volume measuring apparatus for measuring a volume related data of a target box, comprising:
   a shell;
   a processing unit, arranged in the shell;
   a structure light emitting unit, arranged on a first surface of the shell, electrically connected with the processing unit, and emitting invisible structure light for forming a reference pattern when being triggered;
   a first camera, arranged on the first surface of the shell, electrically connected with the processing unit, and controlled by the processing unit to capture a left image, wherein the left image comprises an image of the target box and an image of the reference pattern; and
   a second camera, arranged on the first surface of the shell, electrically connected with the processing unit, and controlled by the processing unit to capture a right image, wherein the right image comprises the image of the target box and the image of the reference pattern;
   wherein, the processing unit is configured to perform a computation based on the image of the target box and the image of the reference pattern in the left image and the right image for generating a depth graph, and the processing unit is configured to scan the depth graph through multiple scanning lines for determining a middle line, a bottom line, a left-side line, and a right-side line of the target box in the depth graph;
   wherein, the processing unit is configured to scan the target box in the depth graph within a range of the middle line, the bottom line, the left-side line, and the right-side line via the multiple scanning lines for obtaining multiple width information, multiple height information, and multiple length information, and the processing unit is configured to compute the volume related data of the target box according to the multiple width information, the multiple height information, and the multiple length information.

2. The volume measuring apparatus in claim 1, further comprising: a guiding unit, electronically connected with the processing unit, arranged on the first surface, wherein the guiding unit is configured to emit a laser beam for forming a cross guiding object when being triggered, and the target box is located in an image capturing range of the first camera and the second camera while the volume measuring apparatus is moved and a horizontal line of the cross guiding object is equal to or greater than a width of the target box.

3. The volume measuring apparatus in claim 1, wherein the processing unit is configured to scan the depth graph through multiple vertical scanning lines for determining the middle line and the bottom line of the target box in the depth graph, and to scan the depth graph through multiple horizontal scanning lines for determining the left-side line and the right-side line of the target box in the depth graph.

4. The volume measuring apparatus in claim 3, wherein the processing unit is configured to scan the target box through the multiple horizontal scanning lines within a range of the left-side line and the right-side line for obtaining the multiple width information of the target box, and to scan the target box through the multiple vertical scanning lines within a range of the middle line and the bottom line for obtaining the multiple height information and the multiple length information of the target box.

5. The volume measuring apparatus in claim 4, wherein the processing unit is configured to randomly group the multiple width information for generating multiple width groups, to randomly group the multiple height information for generating multiple height groups, and to randomly group the multiple length information for generating multiple length groups, and the processing unit is configured to determine whether the multiple width groups are matched with each other, whether the multiple height groups are matched with each other, whether the multiple length groups are matched with each other, and the processing unit is configured to determine a width, a height and a length of the target box based on an average of the multiple width information, an average of the multiple height information and an average of the multiple length information respectively when the multiple width groups are determined to be matching with each other, the multiple height groups are determined to be matching with each other, and the multiple length groups are determined to be matching with each other.

6. The volume measuring apparatus in claim 1, further comprising: a triggering unit, electrically connected with the processing unit, wherein the triggering unit is configured to trigger the processing unit to control the first camera and the second camera when an external operation is received.

7. The volume measuring apparatus in claim 1, further comprising: a transmitting unit, electrically connected with the processing unit, wherein the volume measuring apparatus is connected to an electronic device through the transmitting unit and transmits the left image, the right image, and the volume related data to the electronic device for displaying.

8. The volume measuring apparatus as claimed in claim 1, further comprising: a storage unit, electrically connected with the processing unit, wherein the storage unit is configured to store a look up table, and the look up table comprises a relation between multiple volume related data and multiple fees, wherein the processing unit is configured to inquire the look up table according to the volume related data of the target box for outputting a fee corresponding to the target box.

9. A volume measuring method incorporated with a volume measuring apparatus comprising a structure light emitting unit, a first camera, a second camera, and a processing unit, and the volume measuring method comprising:
  a) controlling the structure light emitting unit to emit invisible structure light for forming a reference pattern;
  b) controlling the first camera and the second camera to capture a left image and a right image respectively, wherein the left image comprises an image of a target box and an image of the reference pattern, and the right image comprises the image of the target box and the image of the reference pattern;
  c) computing the image of the target box and the image of the reference pattern in the left image and the right image to generate a depth graph;
  d) scanning the depth graph through multiple scanning lines for determining a middle line, a bottom line, a left-side line, and a right-side line of the target box in the depth graph;
  e) scanning the target box in the depth graph within a range of the middle line, the bottom line, the left-side line, and the right-side line through the multiple scanning lines for obtaining multiple width information, multiple height information, and multiple length information; and
  f) computing a volume related data of the target box according to the multiple width information, the multiple height information, and the multiple length information.

10. The volume measuring method in claim 9, wherein the volume measuring apparatus comprises a guiding unit, and the step b) further comprises: controlling the guiding unit to emit laser beam for forming a cross guiding object, and controlling the first camera and the second camera to capture the left image and the right image when a horizontal line of the cross guiding object is equal to or greater than a width of the target box.

11. The volume measuring method in claim 9, wherein the step b) further comprises: controlling the first camera and the second camera to capture the left image and the right image when an external operation is received.

12. The volume measuring method in claim 9, wherein the step d) further comprises:
  d1) scanning the depth graph through multiple vertical scanning lines for determining the middle line of the target box in the depth graph;
  d2) scanning the depth graph through the multiple vertical scanning lines for determining the bottom line of the target box in the depth graph;
  d3) scanning the depth graph through the multiple horizontal scanning lines for determining the left-side line and the right-side line of the target box in the depth graph;
  d4) determining that a position pre-determining procedure fails if any of the middle line, the bottom line, the left-side line, and the right-side line is unobtained; and
  d5) determining that the position pre-determining procedure succeeds if the middle line, the bottom line, the left-side line, and the right-side line are all obtained.

13. The volume measuring method in claim 12, wherein the step e) further comprises:
  e1) scanning the target box through the multiple horizontal scanning lines within a range of the left-side line and the right-side line of the target box for obtaining the multiple width information of the target box; and
  e2) scanning the target box through the multiple vertical scanning lines within a range of the middle line and the bottom line of the target box for obtaining the multiple height information and the multiple length information of the target box.

14. The volume measuring method in claim 13, wherein the step f) further comprises:
  f1) randomly grouping the multiple width information for generating multiple width groups;
  f2) randomly grouping the multiple height information for generating multiple height groups;
  f3) randomly grouping the multiple length information for generating multiple length groups;
  f4) determining whether the multiple width groups are matched with each other, whether the multiple height groups are matched with each other, and whether the multiple length groups are matched with each other;
  f5) computing an average of the multiple width information, an average of the multiple height information, and an average of the multiple length information when the multiple width groups are determined to be matching with each other, the multiple height groups are determined to be matching with each other, and the multiple length groups are determined to be matching with each other, and determining the averages as a width, a height, and a length of the target box respectively.

15. The volume measuring method in claim 9, further comprising:
- g) after the step f), inquiring a look up table stored in the volume measuring apparatus according to the volume related data of the target box, wherein the look up table comprises a relation between multiple volume related data and multiple fees; and
- h) obtaining and outputting a fee corresponding to the target box.

* * * * *